Figure 1:
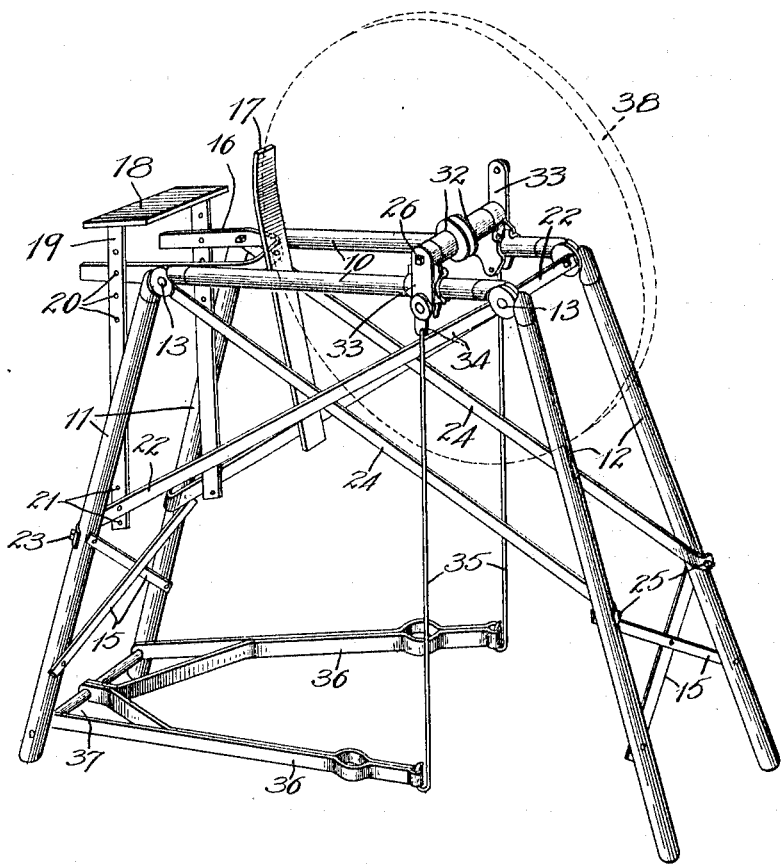

G. H. RICHARDS.
FRAME FOR GRINDSTONES.
APPLICATION FILED OCT. 6, 1913.

1,114,806.

Patented Oct. 27, 1914.
2 SHEETS—SHEET 1.

Witnesses:
W. P. Kilroy
Harold F. Barrett

Inventor:
George H. Richards
By John Howard McElroy
his Atty.

G. H. RICHARDS.
FRAME FOR GRINDSTONES.
APPLICATION FILED OCT. 6, 1913
1,114,806.
Patented Oct. 27, 1914.
2 SHEETS—SHEET 2.
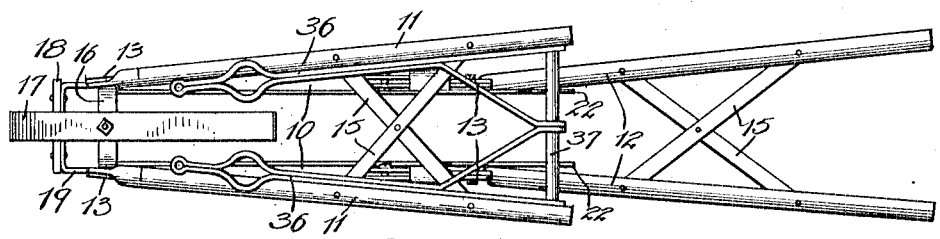
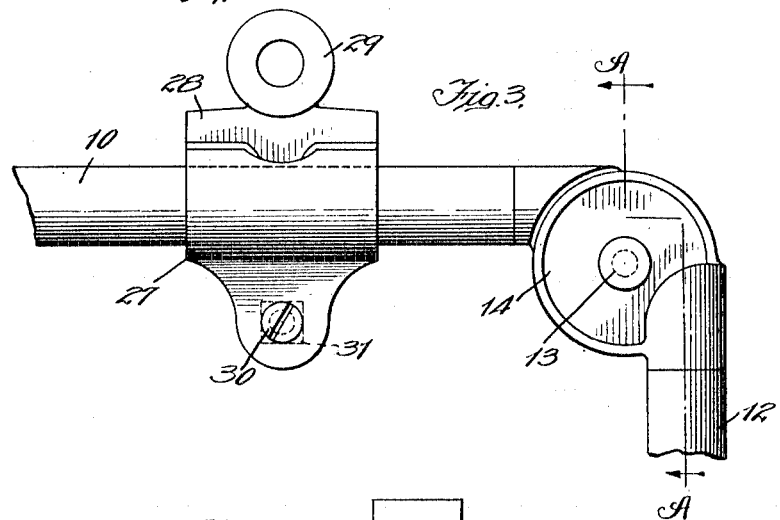
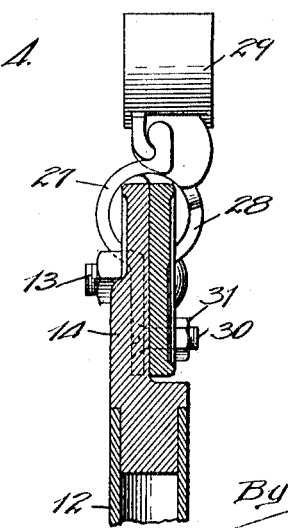
Witnesses:
W. F. Kilroy
Harold G. Barnett
Inventor:
George H. Richards
By John Howard McElroy
his Atty.

UNITED STATES PATENT OFFICE.

GEORGE HAROLD RICHARDS, OF AURORA, ILLINOIS, ASSIGNOR TO AURORA DOOR HANGER AND SPECIALTY COMPANY, OF AURORA, ILLINOIS, A CORPORATION OF ILLINOIS.

FRAME FOR GRINDSTONES.

1,114,806.      Specification of Letters Patent.      Patented Oct. 27, 1914.

Application filed October 6, 1913. Serial No. 793,555.

*To all whom it may concern:*

Be it known that I, GEORGE H. RICHARDS, a citizen of the United States, and a resident of Aurora, in the county of Kane and State of Illinois, have invented certain new and useful Improvements in Frames for Grindstones, of which the following is a full, clear, and exact specification.

My invention is concerned with frames for grindstones, and is designed to produce a frame of the class described that shall be capable of being collapsed for shipment.

To illustrate my invention, I annex hereto two sheets of drawings, in which the same reference characters are used to designate identical parts in all the figures, of which,—

Figure 1 is a perspective view of the complete frame in its erected position and with the grindstone indicated in dotted lines; Fig. 2 is an inverted plan view of the same as it appears when collapsed ready to be crated for shipment; Fig. 3 is a detail view on an enlarged scale, showing one of the joints and the bracket for the shaft-bearing; and Fig. 4 is a view in section on the line A—A of Fig. 3.

In carrying out my invention, I provide two similar side-frames, which are composed of the central portion 10, preferably tubular, having similar legs 11 and 12 pivoted to the ends thereof, as by nuts and bolts 13 passing through the flattened circular ends 14 of the said central portion and legs. The two side frames thus formed are braced toward their lower ends by the pair of crossed brace-pieces 15, which are permanently bolted or riveted to each other and to the legs 11 and 12. When the frame is knocked down or collapsed, as seen in Fig. 2, these braces 15 are still in place holding the parts in their relative positions. The frames are also properly spaced apart at their upper ends by the U-shaped iron bar 16, which is connected to the frames by the adjacent bolts 13 which pass through the adjacent sides of said U-shaped frame, as well as through the central portion and legs which they connect. This U-shaped frame 16 has secured thereon the splash-board 17, which is thus suitably located to protect the operator sitting on the seat 18 from being splashed by the water which may be applied to the bottom of the stone, departing therefrom by its inertia. The seat 18 is rigidly secured on the U-shaped frame 19, which for the purposes of adjustment is preferably provided with a plurality of apertures 20, through which bolts may be passed to secure the U-shaped frame 19 near the open end of the U-shaped frame 16. The lower end of this frame 19 is also provided with a similar series of apertures 21, which are necessary for the vertical adjustment, as the lower end of the U-shaped frame 20 is secured by bolts passing through certain of said apertures 21 and through an aperture in the brace-bar 22, which is pivotally connected at its upper end to the adjacent side of the main frame by the bolt 13, but which is detachably connected at its lower end to the leg 11 by the nut and bolt 23. The two frames are provided with companion brace-bars 24, which are pivotally secured to the upper ends of the legs 11 by the bolts 13, and which are detachably secured at their lower ends to the legs 12 by the nuts and bolts 25. The central portions 10 of the frame are also suitably spaced apart by the bearings for the grindstone-shaft 26 and by said shaft.

As best seen in Figs. 3 and 4, a pair of clips 27 and 28 are provided with the detachable jointed connection, and the clip 28 has a bearing 29 for the grindstone shaft formed integrally therewith. The clips 27 and 28 have the ears extending below the central portion 10 of the frame and adapted to be connected by a bolt 30 and a nut 31. The shaft is mounted in these bearings with the customary clamping sleeves and washers 32, and on the squared ends of the shafts are secured crank arms 33, which have connections 34 pivoted thereon, and extending downward from these connections 34 are links 35 which are hooked into the ends of the treadle frames 36, which are of the shape clearly shown in Fig. 1, and which are pivoted on the rod 37 connecting the lower ends of the legs 11.

With the construction thus far described, it will be understood that the operator on the seat 18 can work the treadles 36 by his feet and rotate the grindstone 38 in the customary manner. By adjusting the position of the clips 27 and 28, the grindstone can be moved nearer the seat as it wears down.

When the frame is to be shipped, if the stone is in place, it is removed, and the bolts 23 and 25 removed, and the links 35 detached, after which the frame can be collapsed into the position shown in Fig. 2, in which position it can be more easily crated for shipment than would be possible if the frame were detached and had to be shipped in the set-up position shown in Fig. 1.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a collapsible grindstone frame, the combination with a pair of side frames, each having a horizontal central portion and two legs pivoted on the ends thereof, of braces for the pairs of legs to prevent their separating laterally, detachable braces on the side frames to hold the legs rigid relative thereto, a seat secured at one end of the frame, bearings adjustably mounted on the central portions of the side frames, so that they can be moved to and from the seat, and a shaft for the stone journaled in said bearings.

2. In a collapsible grindstone frame, the combination with a pair of side frames, each having a horizontal central portion and two legs pivoted on the ends thereof, of braces for the pairs of legs to prevent their separating laterally, detachable braces on the side frames to hold the legs rigid relative thereto, bearings adjustably mounted on the central portions of the side frames, so that they can be moved to and from the splashboard, a shaft for the stone journaled in said bearings, a piece uniting said side frames, and a splash board secured to said piece.

3. In a grindstone frame, the combination with a pair of side frames, each having a horizontal central portion and two legs pivoted on the ends thereof, of braces for the pairs of legs to prevent their separating laterally, braces on the side frames to hold the legs rigid relative thereto, having their upper ends also pivoted concentrically with the legs and their lower ends detachably secured thereto, bearings mounted on the central portions of the side frames, a shaft for the stone journaled in said bearings, a seat-frame supported from the main-frame, and means for adjusting the distance between the seat and the bearings.

4. In a grindstone frame, the combination with a pair of side frames, each having a horizontal central portion and two legs on the ends thereof, of braces for the pairs of legs to prevent their separating laterally, braces on the side frames to hold the legs rigid relative thereto, bearings adjustably mounted on the central portions of the side frames, a shaft for the stone journaled in said bearings, a U-shaped piece pivoted to the angles formed by the central portions and one pair of legs, a splash board secured on the closed end thereof, and a U-shaped seat-frame secured near the seat end thereof to the first mentioned U-shaped frame and at the lower end thereof connected to the adjacent braces.

5. In a collapsible grindstone frame, the combination with a pair of side frames, each made up of a tubular horizontal central portion and tubular legs pivoted thereto, braces for the pairs of legs to prevent their separating laterally, braces pivoted at their upper ends on the centering portion of the side frames, and having their lower ends detachably secured to the legs to hold them rigid relative to the frames, bearings adjustably mounted on the central portions of the side frames, and a shaft for the stone journaled in said bearings.

In witness whereof, I have hereunto set my hand and affixed my seal this 27th day of September, A. D. 1913.

GEORGE HAROLD RICHARDS. [L. S.]

Witnesses:
C. W. HARKNESS,
R. J. DALEIDEN.

---

Copies of this patent may be obtained for five cents each, by addressing the "Commissioner of Patents, Washington, D. C."